US011192465B2

(12) United States Patent
Brombach et al.

(10) Patent No.: US 11,192,465 B2
(45) Date of Patent: Dec. 7, 2021

(54) CHARGING STATION FOR CHARGING MULTIPLE ELECTRIC VEHICLES, IN PARTICULAR ELECTRIC CARS

(71) Applicant: Wobben Properties GmbH, Aurich (DE)

(72) Inventors: Johannes Brombach, Berlin (DE); Isabel Blaak, Aurich (DE)

(73) Assignee: Wobben Properties GmbH, Aurich (DE)

( * ) Notice: Subject to any disclaimer, the term of this patent is extended or adjusted under 35 U.S.C. 154(b) by 230 days.

(21) Appl. No.: 16/606,663

(22) PCT Filed: Apr. 20, 2018

(86) PCT No.: PCT/EP2018/060202
§ 371 (c)(1),
(2) Date: Oct. 18, 2019

(87) PCT Pub. No.: WO2018/193097
PCT Pub. Date: Oct. 25, 2018

(65) Prior Publication Data
US 2021/0039516 A1 Feb. 11, 2021

(30) Foreign Application Priority Data
Apr. 21, 2017 (DE) ............... 10 2017 108 562.9

(51) Int. Cl.
*B60L 53/63* (2019.01)
*B60L 53/67* (2019.01)
(Continued)

(52) U.S. Cl.
CPC ............ *B60L 53/63* (2019.02); *B60L 53/305* (2019.02); *B60L 53/52* (2019.02); *B60L 53/67* (2019.02);
(Continued)

(58) Field of Classification Search
CPC ....................................................... B60L 53/63
(Continued)

(56) References Cited

U.S. PATENT DOCUMENTS 5,103,923 A 4/1992 Johnston et al.
5,642,270 A 6/1997 Green et al.
(Continued)

FOREIGN PATENT DOCUMENTS

DE 69220228 T2 9/1997
DE 10008028 A1 9/2001
(Continued)

OTHER PUBLICATIONS

"Verordnung zu Systemdienstleistungen durch Windenergieanlagen (Systemdienstleistungsverordnung—SDLWindV)", Bundesgesetzblatt Jahrgang 2009 Teil I No. 39, ausgegeben zu Bonn am Jul. 10, 2009, pp. 1734-1746, Jul. 3, 2009 (with machine English translation "Ordinance on system services by wind turbines (System Service Ordinance—SDLWindV)").
(Continued)

*Primary Examiner* — Jerry D Robbins
(74) *Attorney, Agent, or Firm* — Seed Intellectual Property Law Group LLP (57) ABSTRACT

A method for operating a charging station for charging a plurality of electric vehicles, in particular electric automobiles, wherein the charging station is connected to an electricity supply grid at a grid connection point in order thereby to be supplied with electrical energy from the electricity supply grid, the grid connection point is arranged on a first grid section of the supply grid and at least one further electrical consumer is connected to at least one second grid section of the supply grid, the first and the second grid section are connected to one another, the at least one further consumer and/or the at least one second grid section are able (Continued)

to be influenced by the charging station, the charging station is controlled such that a grid voltage in at least one of the grid sections is controlled, and/or a power flow at least in the at least one second grid section is controlled.

20 Claims, 5 Drawing Sheets

(51) Int. Cl.
*B60L 53/30* (2019.01)
*B60L 53/52* (2019.01)
*H02J 3/12* (2006.01)
*H02J 3/18* (2006.01)
*H02J 7/00* (2006.01)
*H02J 7/04* (2006.01)

(52) U.S. Cl.
CPC .................. *H02J 3/12* (2013.01); *H02J 3/18* (2013.01); *H02J 7/0013* (2013.01); *H02J 7/04* (2013.01); *H02J 2207/20* (2020.01)

(58) Field of Classification Search
USPC ........................................................ 320/109
See application file for complete search history.

(56) References Cited

U.S. PATENT DOCUMENTS

| | | | |
|---|---|---|---|
| 5,698,969 | A | 12/1997 | Gyugyi |
| 5,926,004 | A | 7/1999 | Henze |
| 6,109,229 | A | 8/2000 | Pels |
| 7,256,516 | B2 | 8/2007 | Buchanan et al. |
| 7,372,173 | B2 | 5/2008 | Lütze et al. |
| 7,471,007 | B2 | 12/2008 | Bücker et al. |
| 7,777,434 | B2 | 8/2010 | Wobben |
| 8,212,409 | B2 | 7/2012 | Bettenwort et al. |
| 8,446,124 | B2 | 5/2013 | Nagy et al. |
| 8,981,708 | B2 | 3/2015 | Diedrichs et al. |
| 9,186,995 | B2 | 11/2015 | Ichikawa |
| 2005/0015182 | A1 | 1/2005 | Bebic et al. |
| 2006/0192435 | A1 | 8/2006 | Parmley |
| 2008/0077452 | A1 | 3/2008 | Dugan et al. |
| 2009/0174926 | A1 | 7/2009 | Maeda et al. |
| 2009/0189456 | A1 | 7/2009 | Skutt |
| 2010/0079004 | A1 | 4/2010 | Keefe |
| 2011/0106321 | A1 | 5/2011 | Cherian et al. |
| 2011/0116294 | A1 | 5/2011 | Wolf |
| 2013/0006434 | A1 | 1/2013 | Bush et al. |
| 2014/0015319 | A1 | 1/2014 | Nyu |
| 2014/0111165 | A9 | 4/2014 | Dietze et al. |
| 2014/0368032 | A1 | 12/2014 | Doerndorfer |
| 2016/0224045 | A1 | 8/2016 | Wong et al. |
| 2016/0362012 | A1 | 12/2016 | Yao et al. |

FOREIGN PATENT DOCUMENTS

| | | |
|---|---|---|
| DE | 10331084 A1 | 3/2005 |
| DE | 102010002237 A1 | 8/2011 |
| DE | 102011008675 A1 | 7/2012 |
| DE | 102012101799 A1 | 9/2013 |
| DE | 102012210284 A1 | 12/2013 |
| EP | 1467463 A1 | 10/2004 |
| EP | 2362362 B1 | 4/2013 |
| EP | 2592709 A1 | 5/2013 |
| JP | 2003174725 A | 6/2003 |
| JP | 2003-339118 A | 11/2003 |
| JP | 2004-88900 A | 3/2004 |
| JP | 2008-131841 A | 6/2008 |
| JP | 2011-211891 A | 10/2011 |
| JP | 2013013312 A | 1/2013 |
| JP | 2013502896 A | 1/2013 |
| JP | 2014-233180 A | 12/2014 |
| JP | 2016012983 A | 1/2016 |
| RU | 2488495 C1 | 7/2013 |
| RU | 2623621 C1 | 6/2017 |
| TW | M335083 U | 6/2008 |
| WO | 2005/008808 A2 | 1/2005 |
| WO | 2011/020831 A2 | 2/2011 |
| WO | 2012/118184 A1 | 9/2012 |
| WO | 2012/119300 A1 | 9/2012 |
| WO | 2015/196193 A1 | 12/2015 |
| WO | 2016/120240 A1 | 8/2016 |

OTHER PUBLICATIONS

De Breucker, S. et al., "Grid Power Quality Improvements Using Grid-Coupled Hybrid Electric Vehicles", PEMD 2006, Power Electronics, Machine and Drives, 2006, The 3rd IET International Conference on Apr. 4-6, 2006, pp. 505-509.

Dirk Uwe Sauer, "Elektrische Energiespeicher in Hybrid—und Elektrofarhzeugen", Seminar fur Kraftfahrzeug—und Motorentechnik Berlin, Jan. 29, 2009, 27 pages (with machine English translation "Electric energy storage in hybrid and electric vehicles").

English Translation of Taiwanese Office Action dated Jun. 6, 2013, for Taiwanese Patent Application No. 099127612 corresponding to U.S. Pat. No. 8,981,708, 7 pages.

Hartge, S et al., "FACTS Capabilities of Wind Energy Converters", EWEC 2006—European Wind Energy Conference & Exhibition, Athens, pp. 1-9, Feb. 28, 2006.

Kramer, W . et al., "Advanced Power Electronic Interfaces for Distributed Energy Systems Part 1: Systems and Topologies", Technical Report NREL/TP-581-42672, 132 pages, Mar. 2008.

Madawala, Udaya K. et al., ""Living and Mobility"—A Novel Multipurpose in-house Grid Interface with Plug in Hybrid Blue Angle", Sustainable Energy Technologies, IEEE International Conference, Nov. 24, 2008, pp. 531-536.

Sutanto, D., "Alternative Energy Resource from Electric Transportation", Power Electronics Systems and Applications, 2004 Proceedings, 2004 First International Conference on Nov. 9-11, 2004, pp. 149-153.

Windblatt Enercon Magazine for wind energy, issue Apr. 2008, 16 pages.

Islam et al., "V2G Technology to Design a Virtual UPFC", 11th International Conference on Environment and Electrical Engineering, Venice, 2012, p. 568-573.

Kreikebaum et al., "Ubiquitous Power Flow Control in Meshed Grids", IEEE Energy Conversion Congress and Exposition, San Jose, CA, 2009, p. 3907-3914.

Uncontrolled load flow
($Z_1=Z_2=Z_3=Z_4$)

Fig. 5B

Controlled load flow
($Z_1=Z_2<Z_3=Z_4$)

Fig. 5C

CHARGING STATION FOR CHARGING MULTIPLE ELECTRIC VEHICLES, IN PARTICULAR ELECTRIC CARS

BACKGROUND

Technical Field

The present invention relates to a method for operating a charging station for charging a plurality of electric vehicles, in particular electric automobiles. The present invention also relates to a charging station for charging a plurality of electric vehicles. The present invention also relates to a subnetwork of a charging station.

Description of the Related Art

In the course of increasing electromobility, it is possible to observe the trend that an increasing number of electric vehicles or electric automobiles are being authorized for road transport not just for the private sector but also for industrial companies.

Due to the increasing number of electric vehicles, the requirement to erect a comprehensive network of charging systems or charging stations at which the electric vehicles are able to be charged is thus also increasing. In this context, the charging systems mostly draw the power to charge the vehicles from the electricity supply grid.

In this context, problems may arise for the electricity supply grid that have to be dealt with in the future. In urban areas, freeway service stations or in the city center of a city, grid problems may occur when a very high number of electric vehicles have to be charged there at the same time and a large amount of electric power is required relatively locally in a very short amount of time. Voltage problems or power shortages may occur particularly in such areas when the connection lines to which the charging system is connected are not designed to be able to transfer the required power.

Likewise, in such areas, not only the number of electric vehicles but also rapid charging systems constitute a challenge for operating an electricity supply grid. Rapid charging systems for charging electric vehicles require a large amount of power in a very short amount of time and that is not necessarily able to be provided at all times at the charging station.

It is assumed in this context that the number of authorized electric vehicles as well as the distribution of rapid charging systems will increase in the near future.

It should accordingly be taken into consideration that very high load or power flows will have to be transported to and provided by the charging station via the electricity supply grid in a short amount of time in the future. In this context, it is not always guaranteed that the grid section to which the charging station is connected is designed for this high power requirement or these high power flows. Under some circumstances, grid expansion measures have to be taken, which are always connected with undesired additional costs.

Before a grid expansion has to be performed, it is therefore much more desirable to be able to use the existing grid lines or their power limits in the grid sections of the electricity supply grid as much and as effectively as possible.

U.S. Pat. No. 8,981,708 discloses a charging device that is able to charge electrical stores of electric vehicles from the AC voltage grid and is able to feed into the AC voltage grid.

The German Patent and Trademark Office has searched the following prior art in the priority application relating to the present application: DE 10 2010 002 237 A1, DE 10 2011 008 675 A1, DE 10 2012 101 799 A1, U.S. Pat. No. 8,981,708 B2, US 2011/0106321 A1, US 2016/0224045 A1, EP 2 592 709 A1, WO 2016/120240 A1, ISLAM, F. R.; POTA, H. R.; ALI, M. S.: V2G technology to design a virtual UPFC. In: 11th International Conference on Environment and Electrical Engineering, Venice, 2012, p. 568-573. In: IEEE Xplore [online], DOI: 10.1109/EEEIC.2012.6221441, In: IEEE. and KREIKEBAUM, F. (et al.): Ubiquitous power flow control in meshed grids, In: IEEE Energy Conversion Congress and Exposition, San Jose, Calif., 2009, p. 3907-3914, In: IEEE Xplore [online], DOI: 10.1109/ECCE.2009.5316035, In: IEEE.

BRIEF SUMMARY

Provided is a method to control a power flow in a grid section.

Provided is a method to operate a charging station for charging a plurality of electric vehicles, in particular automobiles. To this end, a charging station, which may comprise a plurality of charging columns, is connected to the electricity supply grid at a grid connection point. The charging station may thus draw electrical energy or electric power from the electricity supply grid. The charging station is additionally equipped so as to likewise feed a power into the supply grid. The charging station should accordingly be considered not just to be a consumer, but also to be a generator. In this context, the charging station feeds active power and/or reactive power into the grid when required. The charging station may thus actively influence or change the supply grid, and does not just act as a passive consumer.

To this end, the charging station is arranged at a grid connection point on a first grid section of the electricity supply grid and may draw or feed in a single-phase or multiphase AC current. The grid connection point is also referred to in general as PCC (point of common coupling).

In addition to the first grid section to which the charging station is connected, further electrical consumers, such as for example a factory or a dwelling, may also be connected to a further second grid section of the supply grid. The grid section to which the charging station is connected is in this case connected to the second grid section. The connection does not necessarily have to be direct in this case, such that further grid sections or transformers may also be arranged between the grid sections.

By virtue of the electrical connection between the two grid sections, however, the at least one further consumer and/or the at least one second grid section is able to be influenced by the charging station. If the charging station for example injects a current or a reactive power into the electricity supply grid at the grid connection point, this influences the electrical consumer and/or the second grid section. The further consumer may in this case also be a second charging station.

The charging station is thus configured so as to control a draw of electric power from the electricity supply grid and/or an infeed of electric power into the electricity supply grid at the grid connection point. The charging station is controlled in this case such that a changed grid voltage or a changed power flow arises not just at the PCC of the charging station, but rather also another grid section, to which the charging station is not directly connected, is able to be influenced by the charging station.

The power flow and/or the grid voltage in another grid section is accordingly preferably controlled by limiting the power draw in a targeted manner or by feeding in the power of the charging station at the respective grid connection point in a targeted manner. The grid voltage may in particular be controlled by way of a reactive power infeed or draw.

It has been recognized that power flows, at least partly in a meshed grid or a ring grid, are able to be diverted, for example via grid sections that are subjected to less load, to a grid section with a high power requirement, such as for example to a previously mentioned area containing a high number of electric automobiles to be charged. At least distributions of load flows may be changed. Accordingly, by controlling the load flows or the voltage, grid sections that are subjected to less load may be used as a kind of diversion for power flows or parts thereof.

The method thus makes it possible for the charging station to control the power flows and for grid shortages to be able to be reduced.

In addition or as an alternative, the method makes it possible to control voltage such that undervoltages or overvoltages are able to be avoided in the grid sections.

Again in addition or as an alternative, the grid voltage may be controlled and/or the load flow may be controlled independently of the infeed or draw of active electric power.

At least one further charging station is preferably provided in a further grid section point. The at least two charging stations should in this case be controlled in a coordinated manner or communicate with one another. Each charging station considered on its own is accordingly connected to the electricity supply grid at a grid connection point and is in each case, each on its own, equipped so as to draw or to feed in a power from or to the electricity supply grid.

The charging stations are preferably coupled such that they are able to exchange energy with one another. Coupling to at least one wind farm may also preferably be performed. One preferred coupling is performed such that the units to be coupled, that is to say the at least one wind farm and the charging stations, each have a DC voltage intermediate circuit, and these DC voltage intermediate circuits are directly coupled. Load flows between the units, in particular between the charging stations, are thereby able to be exchanged directly and, as a result, it is possible to take into account a situation in which one charging station is subjected to a heavy load and the other is subjected to a light load.

The charging stations in this case communicate via a suitable communication network, such that coordinated control of the at least two charging stations is possible. By way of example, agreements about a power draw may be made, such that a high power draw by one charging station is able to be compensated by a correspondingly lower power draw by the other charging station, such that the grid is not overloaded as a result.

The joint or coordinated control may in this case be performed for example by a control unit that is arranged directly in the charging station. A superordinate control unit may likewise carry out the coordinated control of the charging stations.

The power flows at a plurality of different grid connection points are thus able to be influenced, namely at the grid sections to which a charging station is also connected.

If a first charging station wishes for example to draw more power from the electricity supply grid than is currently present in the grid section, the first charging station may communicate the higher power requirement to the further charging station. The second charging station, which under some circumstances is not yet subjected to full load, may then feed in a reactive power or even directly an active power from an energy store. In this case, the targeted reactive power results in a changed power flow, such that an additional power flow to the first charging station that is higher than in an uncontrolled grid section arises.

In a further embodiment, it is proposed for a or the at least one further charging station to be connected to the first grid section and for this grid section to have a power limit. This power limit in this case describes the maximum overall power able to be transferred that is able to be transferred to the connected charging station. The power limit in this case depends not only on the structural design of the grid section, but rather also on the grid status or the grid properties. The power limit of the grid section typically depends on the structural design of the grid connection lines, such as the line cross section, the number of phases that are present or the applied voltage. The length of the grid connection lines under consideration may also play a role.

To comply with the power limit of the grid section, each charging station has a respective dedicated station power limit for itself that is able to be changed.

It is thus proposed for each charging station to have a dedicated power limit that is adapted to the maximum possible power flow that is able to occur in a grid section. If the voltage at the grid connection point of a charging station drops excessively, for example, which indicates an excessively low power in the grid section, the power draw of the charging station from the grid is reduced by reducing the power limit.

By adjusting the station power limit, it is accordingly possible to achieve a situation whereby the voltage at the grid connection point of the charging station does not fall below a critical value.

It is additionally proposed for the station power limits to be set depending on one another such that the sum of the station power limits of the grid section to which the charging stations are connected does not exceed the maximum overall power limit of the grid section.

The method for operating the charging station thus allows an adjusted limitation of the power drawn from the electricity supply grid, adjusted to the maximum provided power of the grid section. Power shortages are thus reduced. A charging station is allowed to exceed its power limit as long as the sum of all of the station power limits does not exceed the overall power limit of the grid section.

It is preferably additionally proposed for each charging station to have a controllable variable station power limit.

In this case, the station power limits are controlled according to need, such that a charging station also reduces its respective station power limit when required if another charging station on the same grid section to which the two charging stations are connected increases its charging station limit. Controlling the station power limits according to need in particular makes it possible to take into account the current status of the grid. The power distribution between the charging stations is able to be controlled flexibly and dynamically and thereby adjust quickly to changed situations.

If for example too little power is present in the grid, the charging stations revise their power limit downward so as not to draw too much electric power from the grid. If by contrast large amounts of power are available, since for example a large consumer is for example currently inactive, the power limits may also be raised when required.

It is additionally possible for a charging station to reduce its variable station power limit so that another charging station increases its variable station power limit above its specified station power limit.

The method thus makes it possible to preferably supply particular charging stations with power from the grid and to change power flows by way of the changed power draw of the charging stations.

According to one embodiment, it is proposed for the first grid section to have a first power flow and for the second grid section to have a second power flow. The charging station or at least one of the charging stations influences the grid section to which the charging station is connected by drawing or feeding in electric power such that the power distribution of the first and second power flow between the first and the second grid section is able to be partly controlled.

If we proceed from a meshed network as an example, the targeted drawing or feeding in of electric power may be controlled such that either the first load flow is increased or reduced or the second load flow in the second grid section is able to be increased or reduced.

To this end, the two power flows in the two grid sections are controlled such that the power limits are utilized as much as possible.

The two power flows are thus able to be controlled in the respective grid section according to power requirement. If for example a higher power requirement is required in one of the two grid sections than is allowed by the power limit of the grid section, it is possible, by controlling the load flows of the charging station, to provide additional power via another path to a consumer in the grid section subjected to maximum load.

It is thus proposed for the power flows in different grid sections to be controlled by the charging station in particular such that overloaded grid sections are unburdened and underused grid sections are operated with more power.

In a further embodiment of the method, it is proposed for the power distribution to be controlled such that a voltage in one of the grid sections is changed. In this case, the voltage in the grid section is changed by feeding in a reactive power or a reactive power component of a grid infeed in the grid section. Reactive power may in this case be fed in quite generally in a capacitive or inductive manner. Depending on whether the voltage is fed in in a capacitive or inductive manner, the phase position of the current changes with respect to the voltage in the region of the grid connection point. The changed voltage at the grid connection point or a change in the phase position results in other power flows in the grid section, that is to say for example an increased power flow or a reduced power flow. The targeted reactive power infeed or draw at the grid connection point of the charging station thus changes the load flow in at least one grid section.

Reactive power may in particular be fed into a grid section such that reactive currents that are present in the grid section are compensated down to zero, and as a result this grid section is able to transport more active power.

According to a further embodiment, it is proposed for the power distribution to be controlled by controlling the variable station power limit. Each charging station in this case has, as described above, a station power limit that is changeable and is thus able to be increased or reduced. An increased station power limit in this case means that the charging station is allowed to draw more power from the electricity supply grid. A lower station power limit by contrast means that less power is allowed to be drawn from the grid. The station power limits may accordingly be controlled such that the charging station behaves like a controllable consumer. If for example a charging station is intended to draw a large amount of power on a side of a freeway that is currently subjected to heavy traffic, this charging station may be allowed a higher power draw from the grid than a charging station on the opposite side of the freeway that is currently subjected to light traffic. If the maximum load of the sides of the freeway, cited by way of example, then changes, for example between morning and evening rush-hour traffic or between commuter traffic, or due to an unpredicted diversion situation, the power distribution may be changed. This may be achieved by changing the station power limits.

Changing the station power limits has the advantage that the distribution of the charging stations is easily able to be influenced, but the charging station still maintains a certain degree of autonomy with regard to its control.

The method thus makes it possible to operate the charging station as a controllable load by limiting the power drawn from the electricity supply grid.

According to a further embodiment, it is additionally proposed for the draw of electric power and/or the infeed of electric power to be controlled depending on a grid status and/or on a grid property and/or on a charging station status.

A grid status in this case refers to a status of the electricity supply grid from the following list:

a grid frequency, in particular its deviation from a nominal frequency such as 50 Hz or 60 Hz;

a grid frequency change, that is to say the change in the grid frequency per time;

a grid voltage;

a grid voltage change, that is to say a change in the grid voltage per time;

a grid internal resistance or grid impedance, measured between an external conductor and a neutral conductor and/or a loop impedance measured between external conductor and ground conductor;

a harmonic contribution of the grid voltage;

an active current or an active power flow in the first grid section; and a reactive current or a reactive power flow in the first grid section.

The grid sensitivity and the short circuit current ratio are in this case referred to as a grid property of the electricity supply grid. The grid sensitivity in this case describes a voltage response of the electricity supply grid at a grid connection point to a changed power draw or infeed of the charging station at the grid connection point.

A short circuit current ratio is understood to mean a ratio of a maximum short circuit current able to be provided by the electricity supply grid at the grid connection point with respect to a nominal power able to be drawn by the charging station.

The method additionally proposes to control the draw of electric power and the infeed of electric power depending on a charging station status. The charging station status in this case describes a current status of the charging station, such as a power currently being drawn from the electricity supply grid, or a charging power currently being used to charge the connected electric vehicles. A current reactive power infeed into the supply grid and/or a current active power infeed into the electricity supply grid additionally comes into consideration as a charging station status.

The active and/or reactive power may be determined from a recorded grid voltage and the associated recorded current if the phase position of the recorded current with respect to the recorded grid voltage is additionally known.

The respective station power limit currently set at the charging station and—if an energy store is present in the charging station—also the energy reserves of such an energy store that are still present are also additionally assigned to the charging station status. In this case, an energy store is required for example when active power is fed into the electricity supply grid by the charging station.

According to a further embodiment, it is proposed for the charging station or a plurality of charging stations to communicate not just with one another, but with further grid units. In this case, there is in particular provision for the charging station and the further grid units to be able to be controlled jointly. A grid unit may in this case be for example a controllable switching transformer in a grid section that is able to adjust a voltage level in the respective grid section in which the switching transformer is arranged. Further grid units may additionally also be controllable consumers and controllable infeed units.

The controllable consumers, when too much or too little power is present in the grid, may thus be controlled by the charging stations in a manner coordinated according to need or switched on or switched off.

According to one embodiment, it is proposed for the charging station to be equipped so as to operate as a unified power flow controller, in particular in order thereby to change or to set a phase angle of a current in the electricity supply grid. By virtue of such a unified power flow controller, it is possible to change the phase angle of a current in the electricity supply grid, namely in the grid section to which the unified power flow controller is connected. By virtue of changing the current in this way, it is possible to influence a load flow and thus achieve load flow control. The charging station may thus also efficiently be used for such grid support or grid assistance or grid control.

Provided is a charging station for charging a plurality of electric vehicles, in particular electric automobiles, that is equipped so as to perform a method according to the preceding embodiments.

The charging station is in this case connected to an electricity supply grid at a grid connection point in order thereby to be supplied with electrical energy from the electricity supply grid, wherein the grid connection point is arranged on a first grid section of the electricity supply grid and at least one further electrical consumer is connected to at least one second grid section of the electricity supply grid and the first and second grid section are electrically connected, and the at least one further consumer, which may also be a charging station, and/or the at least one second grid section is able to be influenced by the charging station. In this respect, only those further consumers or grid sections that are also arranged and/or installed close enough to the charging station that it is actually technically possible for them to influence one another are relevant.

The charging station in this case controls the draw of electric power from the electricity supply grid and/or the infeed of electric power into the electricity supply grid at the grid connection point. The charging station in this case controls the draw and the infeed such that a grid voltage and/or a power flow in at least one of the two grid sections is controlled or influenced.

The charging station may for example change a grid voltage and/or a power flow at at least one grid section by feeding in a reactive or active power in a targeted manner for this purpose or limiting the station power limits.

The charging station may in this case also operate at least partly as a phase shifter. In contrast to a conventional pure phase shifter, the charging station consumes for example electric power and shifts not only the phase of a phase voltage. The charging station is accordingly more a combination of a controllable load with station power limits, and the grid infeed thereby permits phase shifter operation.

As a further embodiment, it is proposed that, to draw the electric power from the electricity supply grid or possibly also to feed in electric power at the grid connection point to be controlled by way of a controlled rectifier or of a bidirectional inverter. By using a bidirectional inverter, the charging station is also able to feed electric power into the electricity supply grid and control such a procedure.

Conventional and already known charging systems generally use uncontrolled rectifiers in order to be able to draw passive energy from the supply grid. A controlled rectifier thus makes it possible, in contrast to an uncontrolled rectifier, to be able to feed reactive power into the electricity supply grid via the grid connection point in a targeted manner.

The controlled rectifier may accordingly be used to actively change or to influence the grid via the infeed at the grid connection point. The bidirectional inverter, which may be formed from an active rectifier and an inverter, additionally allows an infeed of active power.

Provided is a subnetwork of an electricity supply grid having a charging station for charging a plurality of electric vehicles, in particular electric automobiles, wherein the subnetwork has at least one first grid section in which a first power flow occurs, at least one second grid section of the electricity supply grid, in which a second power flow occurs, wherein the first and the second grid section are electrically connected.

The charging station device additionally has at least one charging station, wherein the charging station is connected to at least one of the two grid sections via a grid connection point. Further electrical consumers in the charging station device are likewise proposed, wherein at least one further consumer and/or the at least one second grid section are able to be influenced by the charging station, and at least one control unit, wherein the control unit is configured so as to control the draw of electric power for the charging station from the electricity supply grid and/or the infeed of electric power into the supply grid at the grid connection point, wherein a grid voltage in at least one of the grid sections is controlled and/or a power flow in the at least one second grid section is controlled.

Such a subnetwork is in this case able to be controlled particularly well and thus operated efficiently. Such good controllability is in particular achieved by way of at least one charging station that not only draws the power required for itself, but also takes on tasks for supporting the grid and/or influencing a power flow.

The subnetwork preferably contains at least one charging station as claimed in claim 10 or 11, wherein each charging station has a decentralized control unit that is configured so as to communicate with at least one further control unit of another charging station in order to control the draw of electric power from the electricity supply grid and/or the infeed of electric power in a coordinated manner.

A decentralized control topology is thus proposed in which the charging stations communicate directly with one another in order to be able to control the grid voltage or the power flow in a coordinated manner.

According to a further embodiment, the subnetwork additionally comprises a central control unit, wherein the central control unit is likewise configured so as to communicate with a further control unit. The central control unit in this case transmits for example a setpoint value to at least one charging station in order to specify the draw and/or the infeed of electric power. The central control unit may furthermore likewise be intended to specify other control signals to the charging station as well, such as for example the charging station limits described above and/or other setpoint values that are intended to adjust the charging station.

The subnetwork accordingly comprises, in addition to the decentralized control units of the charging station, a superordinate control unit as well, that is to say a mixed topology.

As a further variant, it is likewise proposed to use only a central control unit, wherein the charging station then consists just of control elements and is equipped so as to be able to receive control commands from the central control unit.

The control unit and/or the charging station preferably has an external signal input in order to be able to receive and process external signals. It is in particular proposed in this case for both the decentralized control unit and the decentralized control units to be able to have an external signal input.

A subnetwork is thus proposed that is also able to be controlled via the external interface by superordinate controllers or else grid operators. This allows grid operators to use control commands to coordinate the load flows in a part of the electricity supply grid to which a charging station is connected.

In a further embodiment, the subnetwork also comprises measurement sensors for recording a grid status and/or a grid property and/or a charging station status in the subnetwork, wherein, at this juncture, reference is made to the dependencies and terms described above with regard to the grid status, the grid property and/or the grid loading status. A frequency recorder, a current sensor and/or a voltage sensor are in particular provided. Further variables, such as the frequency change and/or voltage change, are able to be determined using these sensors.

BRIEF DESCRIPTION OF THE SEVERAL VIEWS OF THE DRAWINGS

The present invention is now explained by way of example in more detail below on the basis of exemplary embodiments with reference to the accompanying figures.

DETAILED DESCRIPTION

Figure 1A:
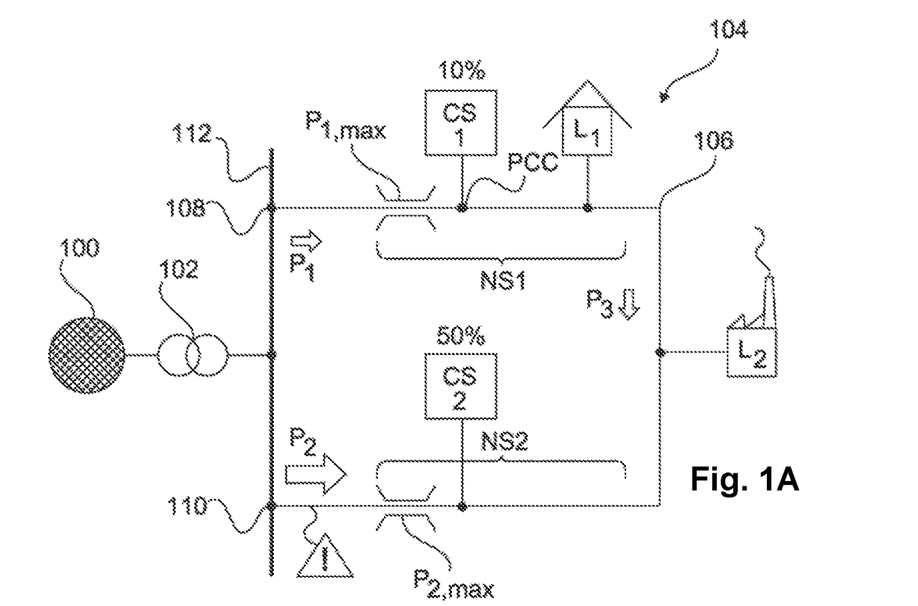
FIGS. 1A and 1B shows one embodiment of an electricity supply grid in the form of a meshed grid.

FIG. 1A shows an electricity supply grid 100 that is connected to a grid segment 104 via a transformer 102. The grid segment 104 is in this case a part or a subregion of the electricity supply grid 100. The grid segment 104 may in this case have any desired form, that is to say the grid connection lines 106 may be wired or connected as desired, or a further grid connection line may span further grid segments. By way of illustration, the grid segment 104 is illustrated as a mesh in a greatly simplified manner according to the embodiment in FIG. 1A.

The grid connection line 106 is in this case electrically connected to the node points 108 and 110 by a grid busbar 112, such that a grid mesh is spanned by the grid connection line. Any desired electrical grid components, such as generators or consumers, may be connected to this grid mesh. In addition, further transformers may also be arranged in the grid segment 104 or between further grid segments, just like safety switches and release apparatuses for grid protection purposes. Since these components play a subordinate role in the principle of the invention, they are not shown by way of illustration.

According to FIG. 1A, two charging stations CS1 and CS2 and two consumers L1 and L2 are connected to the grid connection line 106, which is illustrated as a mesh. Both the charging stations and the consumers are connected to the grid connection line 106 via a grid connection point PCC (point of common coupling). For the sake of clarity, the PCC has been illustrated just for the charging station CS1 in FIG. 1A.

In this case, the grid connection line 106 or the mesh may be divided into various grid sections, two grid sections NS1 and NS2 being illustrated according to FIG. 1A. The first grid section NS1 in this case comprises a maximum power limit $P_{1,max}$, the charging station CS1 and a consumer L1. The second grid section NS2 comprises a maximum power limit $P_{2,max}$ and a further charging station CS2. In this case, the maximum power limits $P_{1,max}$ and $P_{2,max}$ describe the maximum power with which the grid connection line is allowed to be loaded (current load capacity). This limit typically depends on the line cross section of the grid connection line, the number of lines (phases) forming the grid connection line, and on the voltage that is present and the current.

In addition to the components described above, three load flows $P_1$ to $P_3$ are also illustrated in FIG. 1A. To be able to describe the power flows in the meshed network, the size ratios of the arrows describe the magnitude of a power flow in terms of quality. The larger a load flow arrow is illustrated, the more power flows through the respective grid section.

The illustrated power flow P2 that flows through the grid section NS2 or is present there is accordingly greater in FIG. 1A than the power flow P1 that is present in the grid section NS1. In addition, a small amount of power P3 flows between the two grid sections NS1 and NS2 in the direction of the second grid section.

FIG. 1A in this case illustrates the uncontrolled case in which no charging station is performing load flow control according to one embodiment. The charging station CS2 is in this case in a situation in which it requires a large amount of power. The power requirement for the charging station CS2 is high here, and is assumed in the case illustrated here to be 100%. The charging station CS2 is however only able to draw a part thereof, due to the limited capacity of the second grid section. This is illustrated by the power limit $P_{2,max}$, which only allows a draw of at most 50% of the desired power via the grid section NS2. This results in a power shortage at the node point 110, which is illustrated by a warning symbol. The charging station however wishes to draw more power from the grid than it is currently able to draw due to the grid situation.

The charging station CS1 in the grid section NS1 is however not subjected to a high load in this example, such that the power limit $P_{1,max}$ in the grid section NS1 is not yet reached.

Figure 1B:
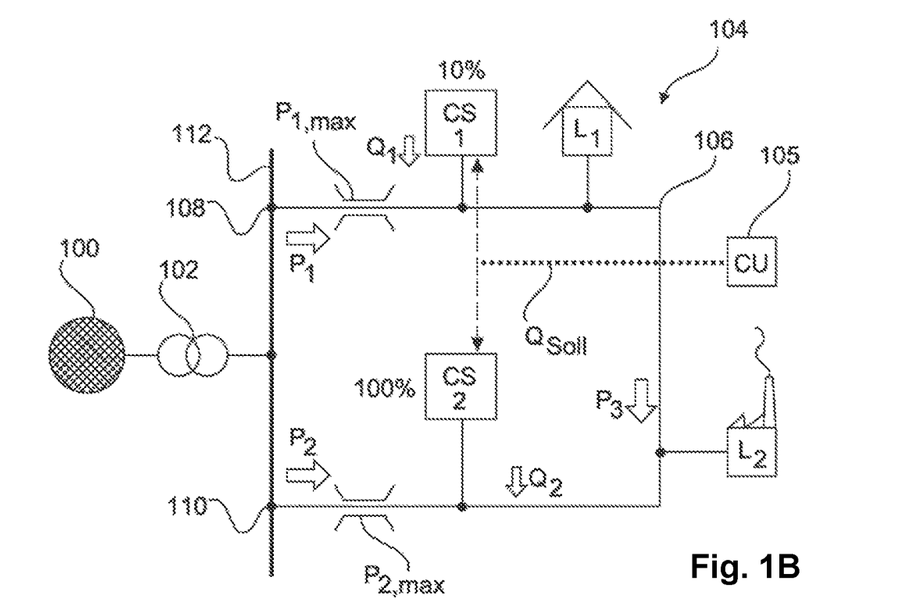

FIG. 1B then shows the case in which the charging station changes the power flow, according to one embodiment described above.

According to FIG. 1B, the charging stations CS1 and CS2 feed a reactive power Q1 and Q2 into the grid segment via their respective PCC. An infeed of reactive power then results in load flows different from in the uncontrolled case of FIG. 1A. In this case, the reactive power is fed in from the charging station CS1 such that a greater power flow P1 flows through the grid section NS1 than in the uncontrolled case (FIG. 1A). Since the charging station CS2, due to the meshed form of the grid segment, is able to be provided with power at the PCC from two sides, it is thus possible to provide the charging station with an increased power P3. In the exemplary embodiment shown in FIG. 1B, the missing 50% in comparison with the uncontrolled case in FIG. 1A is provided to the charging station CS2 for example via the power flow P3. It is pointed out at this juncture that the values, adopted as percentages, have been greatly simplified.

FIG. 1B furthermore shows a control unit 105 (CU) that is equipped so as to specify a setpoint value ($Q_{soll}$) for the reactive power infeed for the charging stations, in order to be able to control the load flows. The control unit may in this case be a superordinate central control unit or be arranged in the charging station in a decentralized manner. Mixed forms consisting of central and decentralized control units are also conceivable.

According to a further embodiment, the charging stations shown in FIGS. 1A and 1B may likewise feed in active power if a suitable energy store is present within the charging station. Since energy stores may be provided in the form of buffer stores in order to prevent voltage fluctuations in the electricity supply grid, it is conceivable, as in the embodiments described above, for the energy stores of a less frequented charging station (CS1) to be able also to briefly provide active power for another charging station or another consumer. This case is not shown in FIGS. 1A and 1B.

Figure 2:
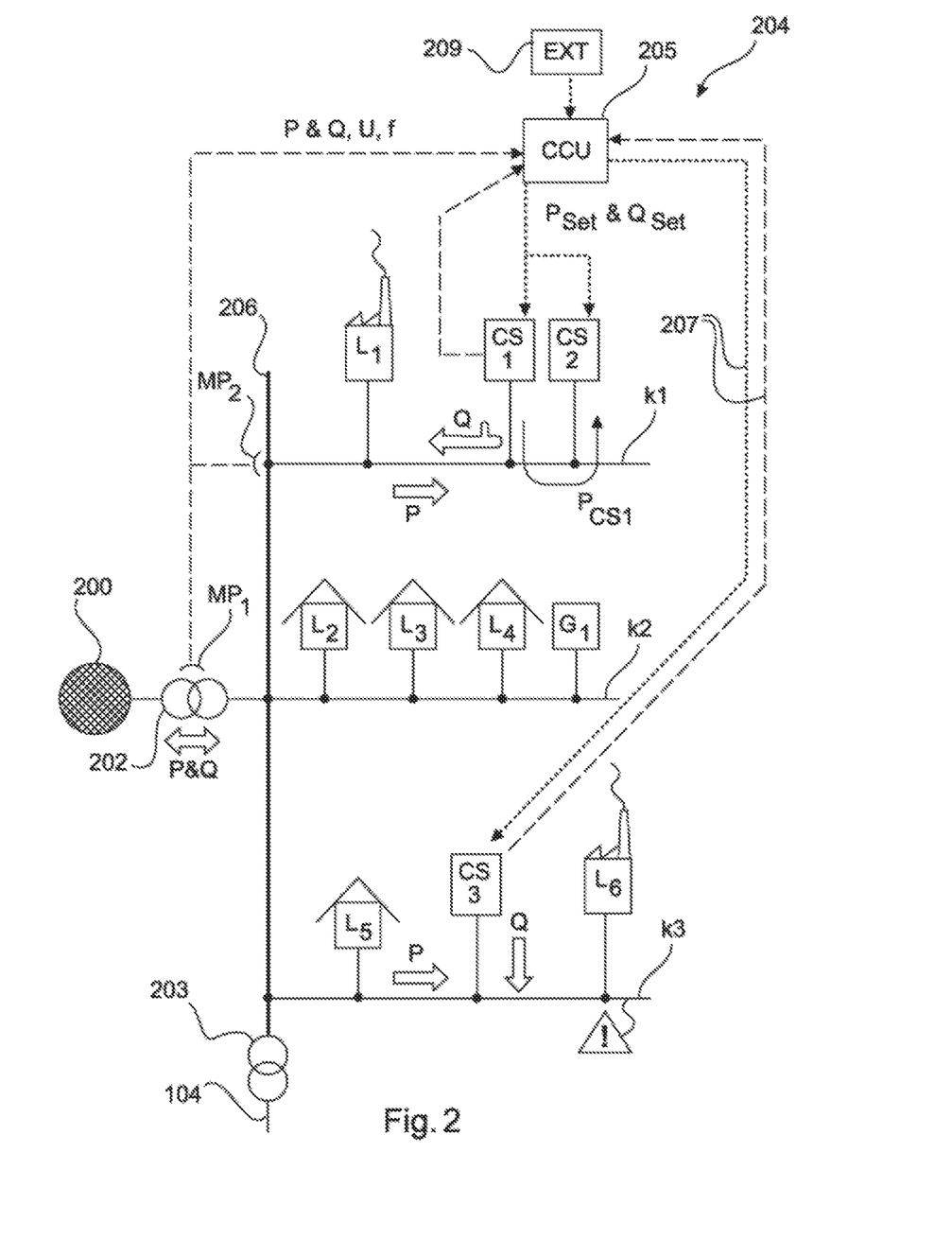
FIG. 2 shows a further embodiment of the electricity supply grid in the form of a chain grid.

In the exemplary embodiment shown in FIG. 2, the grid segment 204 of the electricity supply grid is designed as a star grid and connected to the electricity supply grid 200 via the transformer 202. The grid segment 204 is additionally connected to the grid segment 104 of FIGS. 1A and 1B via the transformer 203.

In contrast to the exemplary embodiments of FIG. 1, the grid segment 204 accordingly comprises three tap lines k1, k2 and k3 to which the charging stations CS1-CS3, the consumers L1-L6 and a generator G1 are connected. The top one of the three tap lines shows that a plurality of charging stations may be connected consecutively to a tap line. In this case, the charging station CS1 may limit its power drawn from the grid, so that a preferred charging station CS2 is able for example to be provided with more power via the tap line. The case is likewise shown in which the charging station CS1, which has an energy store, is additionally able to provide an active power $P_{CS1}$ to the charging station CS2. If a plurality of charging stations are accordingly connected to a grid section, there is the possibility of dynamically distributing the entire available power flow or the grid capacity between the charging stations.

In addition to pure load flow control, feeding in a reactive power likewise allows voltage control within the grid segment 204. The bottom one of the three tap lines k1, k2 and k3, namely the tap line k3, indicates a large consumer L6 according to FIG. 2. If this consumes a large amount of power, particularly reactive power, an undervoltage may result at the grid connection point of the consumer L6. In order to avoid this undervoltage, which is indicated by the warning symbol in FIG. 2, the charging station CS3 may feed in a reactive power and provide voltage support for the grid voltage.

In order that the load flows within the grid segment 204 or between different grid segments (104, 204) are able to be determined, various measurement points having measurement sensors are provided in the grid segments. According to FIG. 2, reactive and active power as well as a grid voltage and a grid frequency are recorded for example by measurement sensors at the measurement points MP1 and MP2. The measurement point MP1 is situated in this case on the transformer 202 that connects the supply grid 200 to the grid segment 204. It makes it possible to measure the power flows that flow into the grid segment or out of the grid segment into the electricity supply grid. This power flow is indicated by the double-headed arrow on the transformer 202. The measurement point MP2 is situated on the node point of the upper tap line with the busbar 206.

FIG. 2 furthermore illustrates a central control unit 205 (CCU). The recorded measured values at the measurement points MP1 and MP2 are in this case transmitted to the central control unit 205. For this purpose, a communication network 207, which is indicated by the dashed and dotted arrows, is available. In this case, the dashed arrows describe measured signals in terms of quality, whereas the dotted arrows describe control signals. Both the measured signals and the control signals may however each be transmitted in both directions. The central control unit 205 accordingly coordinates the load flows in the grid segment 204 based on the measured values from the grid segment, such as for example a grid status and/or a grid property. The charging stations may transmit inter alia their current charging station status to at least one control unit, this being indicated by the returning dashed arrows from the charging station CS1 and CS2. The control unit 205 (CCU) additionally has an external signal input 209. The external signal input 209, illustrated by the EXT symbol, in this case allows the control unit 205 to receive external signals, for example from a grid operator or another superordinate control unit, and to process them.

The described exemplary embodiment thus shows a sub-network that allows active and reactive power management across charging stations in the grid section 204, so that grid losses are able to be reduced and the existing grid capacities are utilized as effectively as possible.

Figure 3:
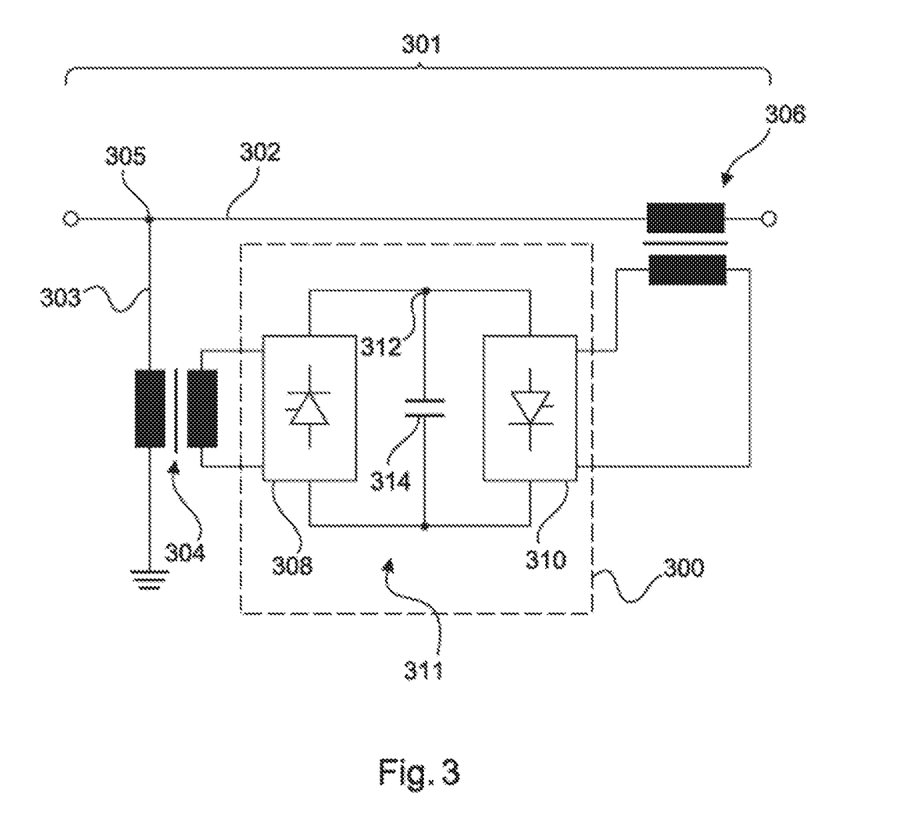
FIG. 3 shows a further embodiment of a charging station that operates as a unified power flow controller.

FIG. 3 shows a charging station 300 that is connected to a grid section 301. In this case, in the exemplary embodiment that is shown, the charging station comprises a unified power flow controller 311, which is also usually referred to synonymously by those skilled in the art as a UPFC. For the sake of simplification, the charging station 300 is indicated only in dashed form. However, the charging station comprises yet more components that are not shown in FIG. 3 for the sake of simplification.

With regard to the topology that is shown, and the same applies to FIG. 4 still to be explained below, requirement-based activation of the unified power flow regulator 311 (UPFC) is preferably proposed. In the case that is shown, the controlled rectifier 308 and the inverter 310 may each be implemented by a switching cabinet.

Two control cabinets 308 and 310 would thus be present, both of which are connected to the parallel transformer 304 during power-drawing operation, that is to say when the charging station draws power from the supply grid. It is then proposed for the load flow control to be activatable when there is low loading, and, for this purpose, for a switching cabinet, particularly the inverter 310, to be connected to the series transformer 306.

In the case of such low loading of the charging station, this requires little power itself, and therefore also does not require the full capacity of the switching cabinets. The switching cabinets then have free capacities to take on tasks of the unified power flow controller.

The unified power flow controller has a parallel transformer 304 and a series transformer 306. The parallel transformer 304 is in this case connected to an auxiliary line 303, and the series transformer 306 is connected to a main line 302. The auxiliary line 303 and the main line 302 are connected to one another via the connection node 305.

The parallel transformer 304 is connected, on the charging station side, to an active rectifier 308. As a result, a current and thereby power from the supply grid, namely the auxiliary line, is able to be drawn and rectified for the DC voltage intermediate circuit 312. The rectifier 308 may in this case control the phase position of the drawn current and thereby control a reactive power component in the auxiliary line and therefore in the supply grid. A reactive power component in the grid section 301 is thereby also able to be changed.

The series transformer 306, on the charging station side, receives a controlled AC current from an inverter 310. This controlled AC current is transformed in the series transformer 306 and is thereby able to influence a current on the grid side, namely a current in the main line 302. A phase position of the current in the main line 302 is thereby able to be changed.

The unified power flow controller 311 comprises the parallel transformer 304, the active rectifier 308, the DC voltage intermediate circuit 312 having the intermediate circuit capacitor 314, the inverter 310 and the series transformer 306. The two transformers 304 and 306 may thus also be considered part of the charging station 300. A further inverter may also be provided instead of the active rectifier 308.

Using the charging station 300, particularly using the unified power flow controller 311 shown in FIG. 3, it is possible in principle to perform a plurality of control operations, including independently of one another.

By way of the controlled rectifier 308 and the parallel transformer 304, corresponding reactive power is able to be made available in the grid in order to compensate the length of the reactive power.

By way of the inverter 310 and the series transformer 306, it is possible to control transverse compensation of the reactive power.

By virtue of a transfer of active power between the two transformers 304 and 306, it is possible, like in a phase shifter, to control a specific flow of active power in the main line or the grid section 301 in a targeted manner.

In a three-phase application, it is also possible to compensate an asymmetry in the grid through corresponding asymmetric operation of the active rectifier 308 or of the inverter 310. The power compensation between the phases is performed in this case via a common DC voltage intermediate circuit.

Figure 4:
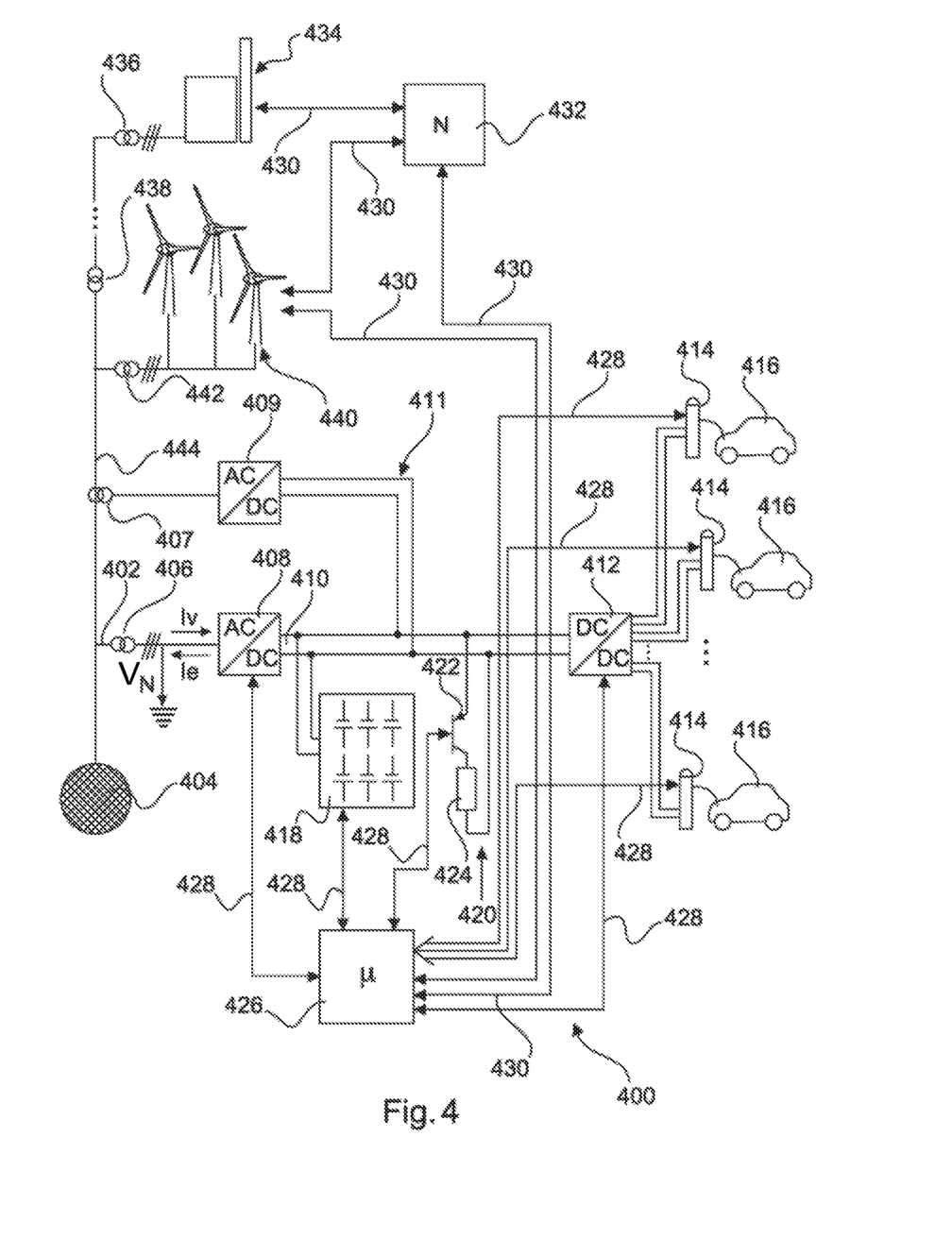
FIG. 4 shows a detailed illustration of a charging station.

FIG. 4 schematically shows a charging station 400 that is connected to an electricity supply grid 404 via a grid connection point 402. This electricity supply grid 404 is illustrated only symbolically here, and may also be referred to simply as a grid for the sake of simplification.

The grid connection point 402 has a grid transformer 406. The charging station 400 moreover draws electrical energy from the grid 404. This takes place essentially through a controlled power draw. The bidirectional inverter 408 is provided for this purpose. This bidirectional inverter 408, during normal operation, converts three-phase electric AC current from the supply grid 404 into a DC current. This DC current may be provided in a DC voltage intermediate circuit 410, which is indicated here as an output of the bidirectional inverter 408.

By way of this bidirectional inverter 408, the electric power draw may also be controlled such that a draw current $I_V$ required therefor is also able to be set in terms of its phase angle $\varphi$ with respect to the grid voltage $V_N$. The grid voltage $V_N$ is indicated here, for the sake of simplicity, at a measurement point between the grid transformer 406 and the bidirectional inverter 408. A corresponding grid voltage of the electricity supply grid 404 on the other side of the grid transformer 406 is accordingly given by the turns ratio of the grid transformer 406.

Moreover, the bidirectional inverter 408 that is provided here may also feed power into the electricity supply grid 404. The bidirectional inverter 408, which may also be referred to here simply as inverter for the sake of simplicity, may thus generate an infeed current $I_e$ opposing the draw current $I_V$. Of course, only the draw current $I_V$ or the infeed current $I_e$ flows.

The essential task of the bidirectional inverter 408 is that of drawing electrical energy from the grid 404, namely by drawing electric power from the grid 404. This power is provided in the DC voltage intermediate circuit 410, namely essentially the distributor circuit 412. The distributor circuit 412 is illustrated as a DC-to-DC converter in order to illustrate that it receives a DC current as input and forwards it to individual charging columns 414 as required. By way of illustration, three charging columns 414, which are representative of many charging columns 414, are illustrated. A respective electric vehicle 416 is currently intended to be charged at one charging column 414. It may also of course be considered in principle that an electric vehicle 416 to be charged is also not always connected to each charging column 414.

The distribution by way of the distributor circuit 412 should likewise be understood only in an illustrative sense, and it may also be considered for example that each charging column 414 controls its charging control and also an energy contingent available thereto on its own by way of a central controller, and for this purpose such a charging column 414 could also in each case be connected directly to the DC voltage intermediate circuit 410. Such a distributor circuit 412, which also lowers the voltage to the voltage level of an electric vehicle 416, is however preferably proposed.

In addition to this distributor circuit 412 that supplies the charging columns 414, a battery bank 418, which may likewise be connected to the DC voltage intermediate circuit 410, is furthermore also illustrated. This battery circuit 418 is thus an electrical store. It may serve to buffer energy in order to compensate load peaks caused by the charging of the electric vehicles 416, such that such load peaks, namely power peaks, are not, at least not completely, passed on to the electricity supply grid 404. The battery bank 418, which is representative here of an electrical store, may however also be used to feed electric power into the electricity supply grid 404, namely by way of the infeed current $I_e$. By virtue of such a battery bank 418, operation in the first and fourth quadrants in accordance with the graph in FIG. 3 is thus also possible.

A chopper system 420 is furthermore connected to the DC voltage intermediate circuit 410. For the sake of simplification, this chopper system 420 has one semiconductor switch 422 and one resistor 424. By virtue of this chopper system 420, power from the DC voltage intermediate circuit 410 is thus able to be consumed for a short time. The semiconductor switch 422 may be driven in a pulsed manner for this purpose so as to accordingly control current pulses from the DC voltage intermediate circuit 410 through the resistor 424. The resistor 424 heats up in the process and may thereby consume the supplied power. The driving of this chopper system 420 is provided in particular for a brief power draw in order to support the grid. The bidirectional inverter 408 may for this purpose accordingly be controlled such that it draws the power to be consumed from the electricity supply grid 404, and the chopper system 420 consumes this or part thereof, as described.

A central controller 426 is in particular provided in order to control the charging station 400. This central controller 426 basically coordinates the corresponding elements of the charging station 400. For this purpose, by way of illustration, internal data transmission lines 428 are provided, these being shown here each with the same reference sign for the sake of simplicity in order thereby to clarify that this relates to internal data transmission lines that transmit data within the charging station 400, in particular namely in both directions, that is to say both from the central controller 426 and to the central controller 426. The central controller 426 is thus connected in each case via an internal data transmission line 428 to the bidirectional inverter 408, the battery bank 418, the chopper system 420, each charging column 414 and the distributor circuit 412.

The central controller 426 may accordingly in particular control the charging operation of the charging station 400, such as for example possibly a charging power allocation for each charging column 414, and the corresponding draw of electric power from the supply grid 404. The battery bank 418 may however also be controlled for buffering purposes, and the power may also be assigned by controlling the distributor circuit 412. Such control operations may in particular be combined. Further data transmission lines may incidentally also be provided, such as for example between the charging columns 414 and the distributor circuit 412. Such data transmission may also be performed centrally by the central controller 426. Other data network topologies for communication within the charging station 400 however also come into consideration in principle.

It is in particular however proposed for the central controller 426 to control the bidirectional inverter 408 in order thereby possibly to control grid support. Depending on the type of grid support, it may in this case be necessary to accordingly control or adjust the control within the charging station 400. It may be necessary for example to drive the battery bank 418 if the bidirectional inverter 408 is intended to feed active power into the grid 404. When specifying the power to be drawn from the grid 404, it may possibly be necessary to control the chopper system 420. Appropriately controlling the charging procedures of the electric vehicles 416 that are connected to the charging columns also comes into consideration.

In order to be able to take into account direct specifications by a grid operator as well, an external data transmission line 430 is additionally provided. Such an external data transmission line 430 is shown here leading to a grid controller 432. This grid controller 432 may also be representative of a grid operator that operates the electricity supply grid 404. Such a grid operator or the grid controller 432 may for example require an active power infeed. In order to control this or something else, the central control apparatus 426 of the charging station 400 may also pass information to the grid controller 432 via the external data transmission line 430, which information communicates how much power capacity the charging station 400 and thus in particular the battery bank 418 actually has available. The grid controller 432 may however for example also specify limit values. Such limit values may for example mean a maximum active power draw for the charging station 400, or a gradient limit for the maximum change of an active power draw, to name just two examples.

FIG. 4 furthermore illustrates a power station 434 that is connected to the electricity supply grid 404 via a power station transformer 436. It is pointed out as a precaution that further transformers 438 may also be provided, this however not being the case here. Such a further transformer 438 is shown only by way of illustration in order to clarify that different voltage levels may also exist in the electricity supply grid 404.

In any case, the power station 434 may be provided as a conventional power station, such as for example a coal-fired power station or a nuclear power station. A wind farm 440, which is connected to the electricity supply grid 404 via a farm transformer 442, is furthermore shown by way of illustration. Both the conventional power station 434 and the wind farm 440 may likewise communicate with the grid controller 432 via external data transmission lines 430. There is additionally provision for the wind farm 440 to be able to communicate directly and exchange data with the central controller 426 and thus the charging station 400.

FIG. 4 is in particular intended to illustrate that the wind farm 440 and the charging station 400 are arranged essentially close to one another in the electricity supply grid 404. They are also arranged on a grid section having the same voltage level. A correspondingly large distance to the power station 434 is also intended to be illustrated by corresponding points between the further transformer 438 and the power station transformer 436.

The wind farm 440 is thus arranged comparatively close to the charging station 400, in any case with respect to the connection between the charging station and the wind farm via a section of the electricity supply grid 404. This section is indicated here as a connecting section 444 and denotes the area between the farm transformer 442 and the grid transformer 406 of the charging station 400. Such a connecting section does not however have to be provided as a direct connection line, but may also contain further branches to other consumers or decentralized feeders.

In any case, the charging station 400 and the wind farm 440 are close enough to one another that the wind farm 440 is able to influence the voltage at the grid connection point 402 of the charging station 400. In the same way, the charging station 400 is able to influence a voltage on the farm transformer 442.

With knowledge of this proximity between the wind farm 440 and the charging station 400, it is now proposed for these to coordinate with one another, in particular with regard to grid support. To this end, there is provision for communication between the wind farm 440 and the charging station 400, this being illustrated here by an external data transmission line 430 to the central controller 426. Such coordination may also relate to the execution of a request from a grid operator by the grid controller 432. If the grid operator thus specifies for example a requirement to reduce active power in the electricity supply grid 404, then this active power reduction may be coordinated by the wind farm 440 feeding in a part less thereof, for example half, and the charging station 400 additionally drawing a part thereof, for example the remaining half.

Coordination may however also be considered for other tasks, such as for example voltage control by way of a reactive power infeed. There may in particular be provision here for both the wind farm 440 and the charging station 400 to take on part of the required reactive power infeed. This may have the advantage that neither of them, that is to say neither the wind farm 440 nor the charging station 400, have to control a very large phase angle, which may be inefficient, but rather that they are able to be distributed such that both feed in part of the reactive power and thus each do not have to control an excessively large phase angle.

FIG. 4 furthermore illustrates a unified power flow controller 411, which comprises the grid transformer 406, which may also be referred to here as a parallel transformer, and a series transformer 407. The unified power flow controller furthermore has a DC voltage intermediate circuit 410 and a rectifier 409 and an inverter 408.

Figure 5A:
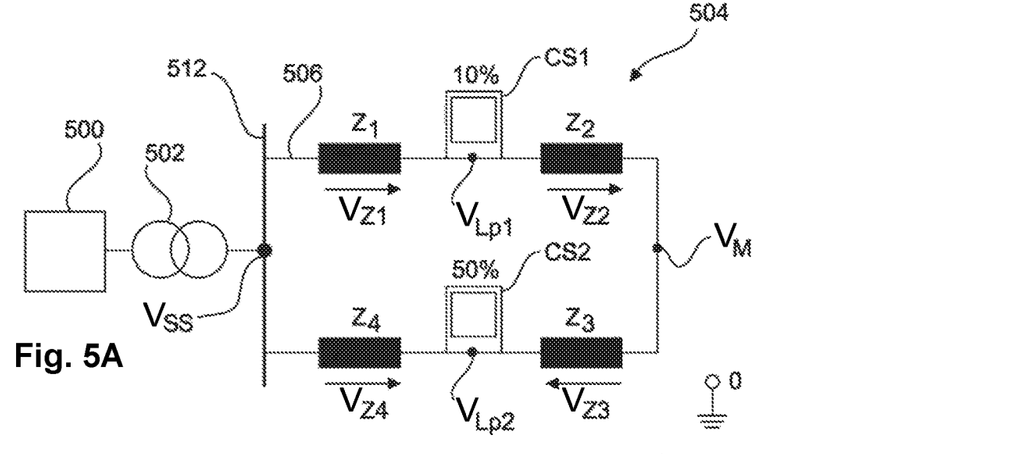
FIG. 5A-5C shows load flow control in a grid segment.

FIG. 5 shows load flow control in a grid segment 504. The grid segment 504 according to FIG. 5A has a transformer 502, a busbar 512, four grid impedances Z1 to Z4 and two charging stations CS1 and CS2. The grid segment 504 is in this case connected to an electricity supply grid 500 via the transformer 502.

According to FIG. 5A, the grid connection line 506 is additionally connected to the busbar 512 in meshed form, such that the grid impedances Z1 to Z4 and the charging stations CS1 and CS2 are arranged in a series-connected ring. The voltages VZ1 to VZ4 respectively drop across the four grid impedances Z1 to Z4, these voltages being split in each case into a real part and an imaginary part in order to improve the description.

The grid segment 504 additionally has four node points $V_{SS}$, $V_{LP1}$, $V_M$ and $V_{LP2}$ as voltage reference points. The reference potential 0 is illustrated by a symbol for electrical ground.

Figure 5B:
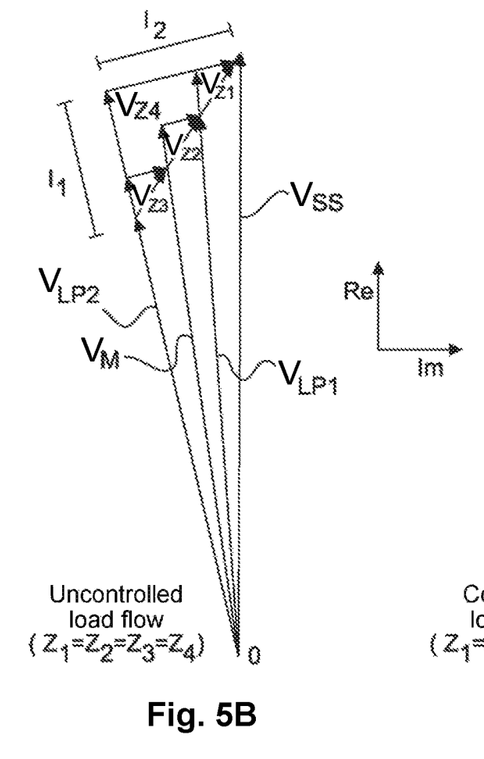
Figure 5C:
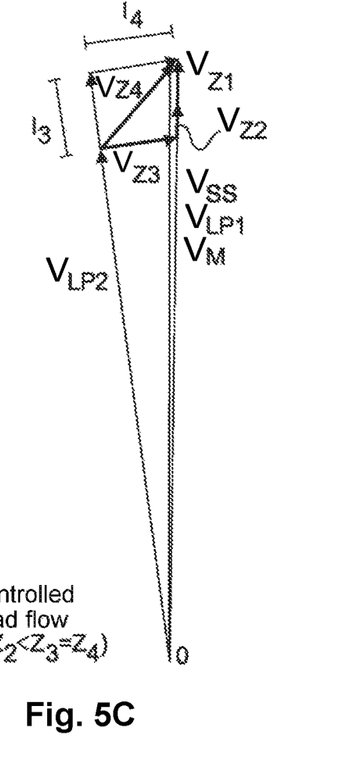

FIGS. 5B and 5C show the voltages $V_{Z1}$ to $V_{Z4}$ dropping across the grid impedances $Z_1$ to $Z_4$ in a vectorial illustration. The absolute voltages at the node points $V_{SS}$, $V_{LP1}$, $V_M$ and $V_{LP2}$ with respect to the reference potential 0 are additionally illustrated in vector form.

FIG. 5B shows the voltages $V_{Z1}$-$V_{Z4}$ for the case in which the load flow is not controlled by at least one of the two charging stations. The voltage vectors $V_{Z1}$ to $V_{Z3}$ have both a real part and an imaginary part which may be referred to as transverse and longitudinal components for the sake of simplification.

If the voltage vectors $V_{Z1}$-$V_{Z3}$ are compared with the vector $V_{Z4}$, it is able to be seen that the lengths of the transverse and longitudinal components 11 and 12 of $V_{Z4}$ in FIG. 5B are substantially longer than in the case of $V_{Z1}$-$V_{Z3}$.

In the exemplary embodiment that is shown, the greatest voltage accordingly drops across the resistor Z4. The greatest power flow accordingly also flows here.

FIG. 5C shows the voltage vectors when the charging station CS1 feeds in a reactive power such that the imaginary parts of the voltages VZ1 and VZ2 are compensated. Such a reactive power infeed may be brought about by a unified power flow controller (UPFC) of a charging station. Reducing or compensating the imaginary parts of the voltages VZ1 and VZ2 results in correspondingly changed voltages VZ3 and VZ4, in accordance with Kirchhoff's mesh rules.

This is able to be seen in FIG. 5C, and the transverse and longitudinal components of the voltage $V_{Z3}$ have accordingly become larger in comparison with FIG. 5B. The transverse and longitudinal components 13 and 14 of the voltage $V_{Z4}$ have on the other hand become shorter.

The voltage or the power has thus become smaller at Z4 and greater at Z3. A greater load flow thus flows through the upper part of the mesh and the grid impedance $Z_3$ than in the uncontrolled case. By virtue of the charging station CS1 feeding in reactive power in a targeted manner in the grid section having the grid impedances $Z_1$ and $Z_2$, it is thus possible to at least partly control a power flow.

The invention claimed is:

1. A method, comprising:
 operating a charging station for charging a plurality of electric vehicles, wherein:
  the charging station is coupled to an electricity supply grid at a grid connection point in order thereby to be supplied with electrical energy from the electricity supply grid,
  the grid connection point is arranged on a first grid section of the electricity supply grid,
  an electrical consumer is coupled to a second grid section of the electricity supply grid,
  the first and the second grid sections are coupled to one another, and
  at least one of: the electrical consumer or the second grid section are configured to be influenced by the charging station,
  wherein the operating comprises:
  controlling the charging station such that at least one of:
   a grid voltage in at least one of the first or the second grid sections is controlled, or
   a power flow at least in the at least one second grid section is controlled.

2. The method as claimed in claim 1, wherein the charging station is a first charging station, wherein a second charging station is coupled to the electricity supply grid,
 wherein the first and second charging stations are configured to be jointly controlled and to at least one of: communicate with one another or exchange power between one another,
 wherein the second charging station is configured:
  to control at least one of: a draw of electric power from the electricity supply grid or an infeed of electric power into the electricity supply grid such that at least one of:
   the grid voltage in at least one of the first or second grid sections is controlled, or
   the power flow at least in the second grid section is controlled.

3. The method as claimed in claim 2, wherein:
 the second charging station is coupled to the first grid section, and
 the first grid section has a power limit that limits an overall power configured to be transferred to the first and second charging stations, wherein:
 to comply with a maximum overall power, each of the first and second charging stations has a station power limit,
 the station power limits of the first and second charging stations are set depending on one another such that a sum of first and second station power limits does not exceed the power limit of the first grid section, and
 the first and second station power limits are configured to be controlled such that the charging station reduces its station power limit when required such that another charging station on the respective grid section increases its respective charging station limit.

4. The method as claimed in claim 3, wherein:
 each charging station has a specified station power limit and wherein the sum of the specified station power limits of the charging stations of the respective grid section does not exceed the maximum overall power limit, and
 each charging station has a controllable variable station power limit, and wherein the charging station reduces its variable station power limit below its specified station power limit such that another charging station increases its variable station power limit above its specified station power limit, wherein the sum of the variable station power limits does not exceed the maximum overall power limit of the respective grid section.

5. The method as claimed in claim 2, wherein the first and second charging stations are coupled to one or more DC voltage intermediate circuits and configured to exchange power between one another via the one or more DC voltage intermediate circuits.

6. The method as claimed in claim 1, wherein:
the first grid section has a first power flow,
the second grid section has a second power flow, and
wherein the charging station controls the draw or infeed of electric power such that a power distribution of transferred power between the first and second power flows is thereby at least partly controlled.

7. The method as claimed in claim 6, wherein:
the power distribution is controlled such that a voltage in one of the first or second grid sections is changed such that the first or second power flow in the respective first or second grid section is thereby increased or reduced, and
the change of the voltage in the respective first or second grid section is controlled by feeding a reactive power component or a reactive power component into the respective first or second grid section.

8. The method as claimed in claim 6, wherein:
the power distribution is controlled such that a voltage in one of the first or second grid sections is increased or reduced to increase or to reduce the respective power flow in the respective first or second grid section, and
the voltage in the respective first or second grid section is increased or reduced by increasing or reducing a controllable variable station power limit of at least one charging station to increase or to reduce the power drawn from the electricity supply grid.

9. The method as claimed in claim 6, wherein at least one of: the draw of electric power or the infeed of electric power is controlled depending on at least one of: a grid status, a grid property, or a charging station status,
wherein the grid status denotes a status of the electricity supply grid, selected from the list comprising:
a grid frequency,
a grid frequency change,
the grid voltage,
a grid voltage change,
a grid resistance,
a grid loop impedance,
a harmonic contribution of the grid voltage,
an active current in the first grid section,
an active power flow in the first grid section,
a reactive current in the first grid section, and
a reactive power flow in the first grid section, and
wherein the grid property denotes a property of the electricity supply grid, selected from the list comprising:
a grid sensitivity, which is defined as a voltage response of the electricity supply grid at the grid connection point to a changed power draw of the charging station at the grid connection point, and
a short circuit current ratio, which denotes a ratio of a maximum short circuit current able to be provided by the electricity supply grid at the grid connection point with respect to a nominal power able to be drawn by the charging station, and
wherein the charging station status denotes a status of the charging station, selected from the list comprising:
a power drawn from the electricity supply grid,
a charging power used to charge electric vehicles coupled to the charging station,
a reactive power infeed into the electricity supply grid,
a station power limit, and
an energy reserve of an energy store of the charging station.

10. The method as claimed in claim 7, wherein the feeding the reactive power component or the reactive power component into the respective first or second grid section comprises feeding in the reactive power or the reactive power component in a capacitive or inductive manner.

11. The method as claimed in claim 1, wherein the charging station is correlated with grid units, wherein the charging station and the grid units are controlled jointly and are configured to communicate with one another, wherein the grid units are selected from the list comprising:
a controllable switching transformer configured to control a voltage level in the first or second grid sections,
a controllable consumer configured to consume electric power from the electricity supply grid,
a controllable feeder configured to feed electric power into the electricity supply grid, wherein the controllable feeder is at least one of a wind power installation or a wind farm, and
a further charging station.

12. The method as claimed in claim 1, wherein the charging station is configured to operate as a unified power flow controller to change or to set a phase angle of a current in the electricity supply grid.

13. A charging station for charging a plurality of electric vehicles, wherein the charging station is configured to perform the method as claimed in claim 1.

14. The charging station as claimed in claim 13, comprising a controlled rectifier or a bidirectional inverter configured to draw electric power from the electricity supply grid at the grid connection point.

15. The charging station as claimed in claim 13, comprising a unified power flow controller configured to change or set a phase angle of a current in the electricity supply grid.

16. A subnetwork of an electricity supply grid, wherein the subnetwork comprises:
a first grid section of the electricity supply grid, in which a first power flow occurs;
a second grid section of the electricity supply grid, in which a second power flow occurs, wherein the first and the second grid sections are electrically coupled to one another;
at least one charging station for charging a plurality of electric vehicles, wherein the charging station is coupled to at least one of the first and second grid sections via a grid connection point;
an electrical consumer, wherein at least one of: the electrical consumer or the second grid section are able to be influenced by the charging station; and
a first controller configured to:
control at least one of: a draw of electric power for the charging station from the electricity supply grid or an infeed of electric power into the electricity supply grid at the grid connection point, wherein at least one of:
a grid voltage in at least one of the first and second grid sections is controlled, or
a power flow at least in the second grid section is controlled.

17. The subnetwork as claimed in claim 16, wherein each charging station has a decentralized control unit, wherein the first controller is configured so as to communicate with a second controller to control at least one of: the draw or the infeed of electric power in a coordinated manner.

18. The subnetwork as claimed in claim 16, further comprising a central control unit configured so as to communicate with a second controller and to transmit a setpoint value to the charging station in order to control at least one of: the draw or the infeed of electric power in a coordinated manner.

19. The subnetwork as claimed in claim 16, wherein at least one of: the controller or the charging station has an external signal input configured to receive and process an external signal.

20. The subnetwork as claimed in claim 19, further comprising one or more measurement sensors for recording a grid status, a grid property, and a charging station status, wherein:
   the grid status denotes a status of the electricity supply grid, selected from the list comprising:
      a grid frequency,
      a grid frequency change,
      the grid voltage,
      a grid voltage change,
      a grid internal resistance,
      a grid loop impedance,
      a harmonic contribution of the grid voltage,
      an active current in the first grid section,
      an active power flow in the first grid section,
      a reactive current in the first gird section, or
      a reactive power flow in the first grid section,
   the grid property denotes a property of the electricity supply grid, selected from the list comprising:
      a grid sensitivity, which is defined as a voltage response of the electricity supply grid at the grid connection point to a changed power draw of the charging station at the grid connection point, and
      a short circuit current ratio, which denotes a ratio of a maximum short circuit current able to be provided by the electricity supply grid at the grid connection point with respect to a nominal power able to be drawn by the charging station, and
   the charging station status denotes a status of the charging station, selected from the list comprising:
      a power drawn from the electricity supply grid,
      a charging power used to charge electric vehicles coupled to the charging station,
      a reactive power infeed into the electricity supply grid,
      a station power limit, and
      an energy reserve of an energy store of the charging station.

* * * * *